United States Patent
Xu et al.

(10) Patent No.: US 8,456,982 B2
(45) Date of Patent: Jun. 4, 2013

(54) SYSTEM AND METHOD FOR FAST NETWORK RESTORATION

(75) Inventors: Fengman Xu, Wylie, TX (US); Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 280 days.

(21) Appl. No.: 12/869,440

(22) Filed: Aug. 26, 2010

(65) Prior Publication Data

US 2012/0051212 A1   Mar. 1, 2012

(51) Int. Cl.
*G01R 31/08* (2006.01)
(52) U.S. Cl.
USPC ........... 370/223; 370/249; 370/241; 370/217; 370/225; 370/390; 370/395.5

(58) Field of Classification Search
None
See application file for complete search history.

(56) References Cited

U.S. PATENT DOCUMENTS

| | | | | |
|---|---|---|---|---|
| 7,830,786 | B2* | 11/2010 | Atlas et al. | 370/217 |
| 8,004,960 | B2* | 8/2011 | Raj | 370/216 |
| 2007/0121615 | A1* | 5/2007 | Weill et al. | 370/389 |
| 2009/0046587 | A1* | 2/2009 | Kothari et al. | 370/238 |
| 2009/0296713 | A1* | 12/2009 | Kompella | 370/392 |

* cited by examiner

*Primary Examiner* — Kibrom T Hailu

(57) ABSTRACT

An approach is provided for enabling fast network restoration. A node, within a network of multiple protocol label switching (MPLS) nodes, detects a failure condition affecting the node. A micro-loop with a neighboring node of the affected node is detected. A label is determined for a subsequent hop from the neighboring node to break the micro-loop for redirecting of traffic to a destination node in the network, wherein the subsequent hop does not create a loop with respect to the affected node.

17 Claims, 17 Drawing Sheets

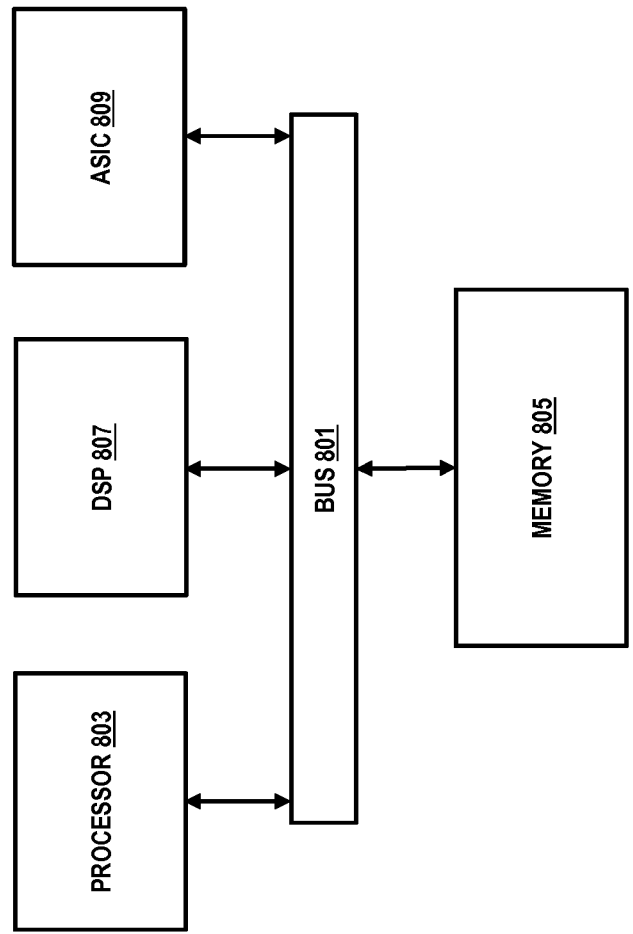

US 8,456,982 B2

SYSTEM AND METHOD FOR FAST NETWORK RESTORATION

BACKGROUND INFORMATION

With the increase in demand for broadband communications and services, telecommunication service providers are in a constant state of flux to provide the fastest and most reliable service to their customers. Not surprisingly, a vast interconnection of data networks has emerged to support these services. Any disruption in the communication paths between network nodes (e.g., routers) can result in packet loss, latency, or delay, causing slow service as well as intermittent interruptions of service to customers. Hence, in modern data communication networks, the network restoration speed is critically important to ensure that the customer applications are not impacted during any carrier network failures. In fact, network availability is often a part of the Service Level Agreement (SLA) between a carrier and its customers. For example, a common benchmark restoration speed is sub-50 ms; that is, the customer traffic should be re-routed within 50 ms of any network node or link failure. Traditional approaches have not been successful at achieving these restoration speeds, resulting in degraded or halted communication services. The development of new network recovery schemes has the additional challenge of maintaining compatibility and interoperability with existing protocols, as an overhaul of current mechanisms would be both expensive and limited in deployment.

Therefore, there is a need for an approach to network restoration that can satisfy requirements for rapid recovery and ensure interoperability with current protocols.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a diagram of a chip set that can be used to implement various exemplary embodiments.

DESCRIPTION OF THE PREFERRED EMBODIMENT

A preferred apparatus, method, and software for fast network restoration based on routing via loop-free alternates (LFA) and by breaking micro-loops are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to networks that carry data packets using Multiprotocol Label Switching (MPLS) technology, it is contemplated that various exemplary embodiments are applicable to other equivalent systems and traffic flows.

Figure 1A:
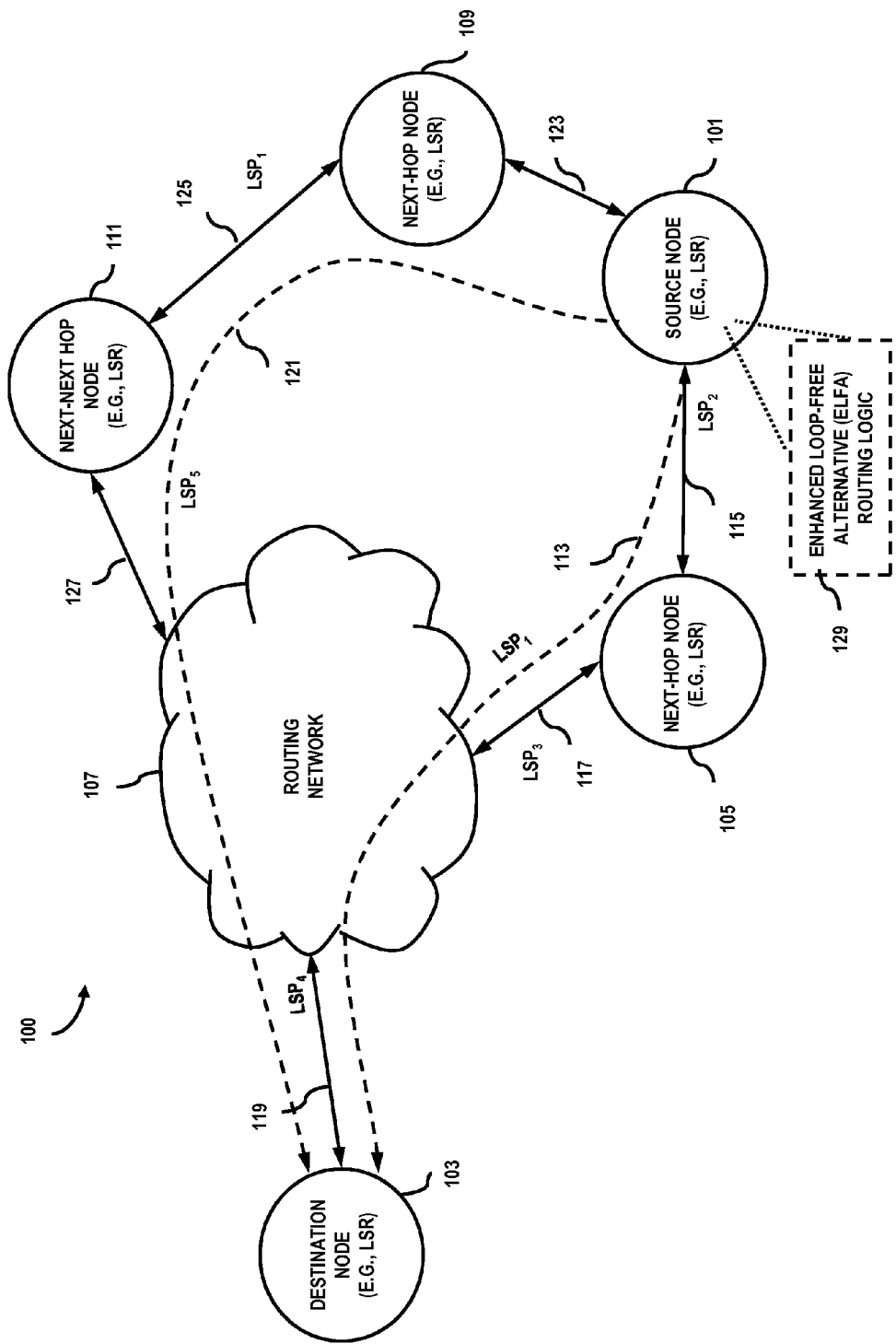
FIGS. 1A and 1B are diagrams of a system configured to provide fast network recovery in case of a failure by routing via loop-free alternates by breaking micro-loops, according to an exemplary embodiment.
Figure 1B:
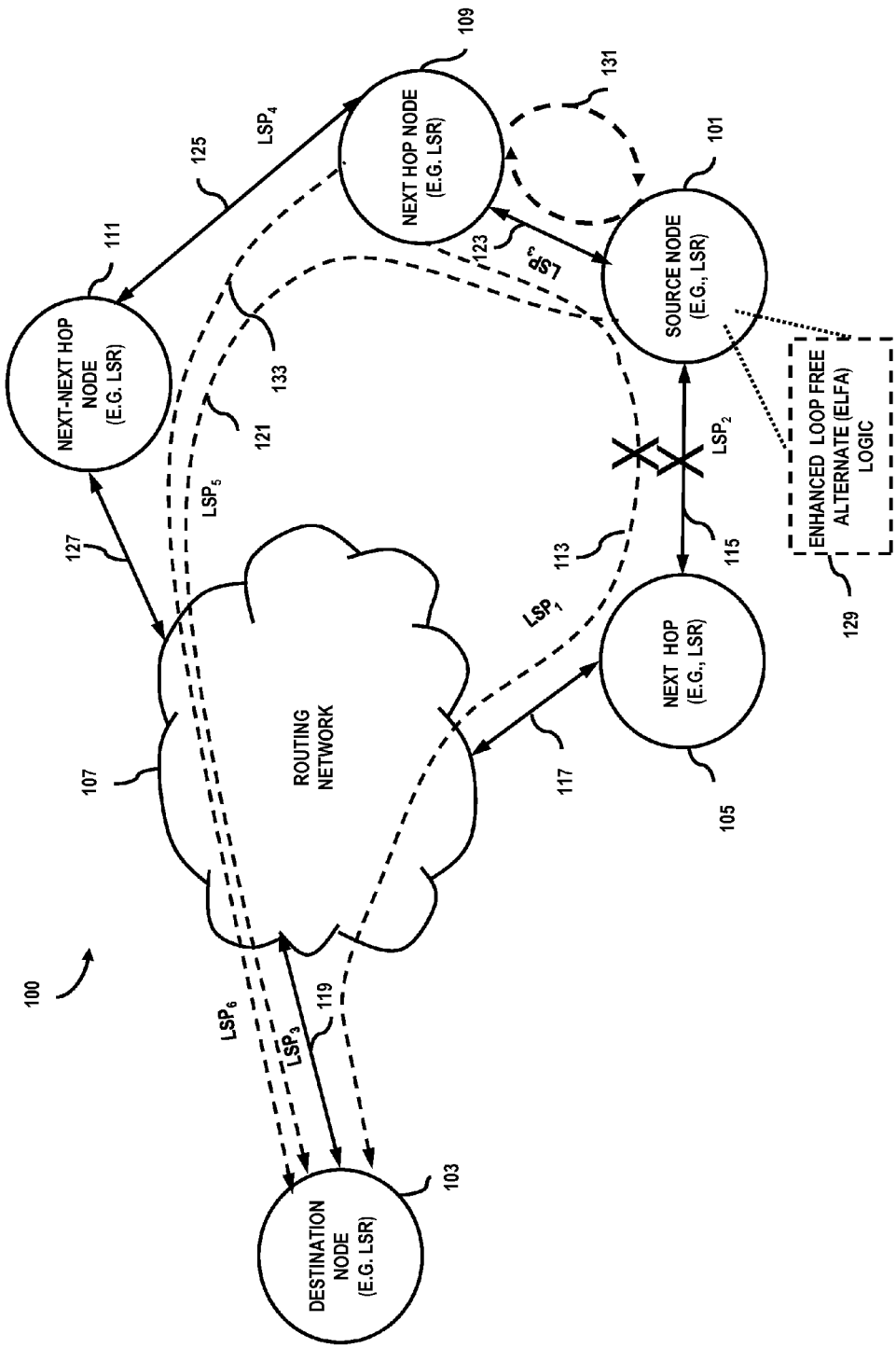

FIGS. 1A and 1B are diagrams of a system configured to provide fast network recovery in case of a failure by routing via loop-free alternates by breaking micro-loops, according to an exemplary embodiment. It is recognized that nodes in a network need to be rapidly notified of failures or changes in conditions/states so that redundancies (if any) built into the network can be immediately activated and service restored to the users (e.g., customers). For the purposes of illustration, a communication system 100 for providing Enhanced Loop-Free Alternate (ELFA) routing is described. In particular, certain embodiments are explained in the context of Multiprotocol Label Switching (MPLS) technology. This technology is based on setting up virtual paths between communication nodes (e.g., routers) in a network. MPLS provides high speed transfer of packets over data networks by appending labels to packets that contain information related to the path that the data packet will take to reach its destination. The use of such labels eliminates the need for routers to examine the header of each packet, resulting in the faster delivery of packets to their destination. The details on MPLS technology is further described in Internet Engineering Task Force (IETF) Request for Comment (RFC) 3031, which is incorporated herein in its entirety. Even though various technologies such as MPLS predominantly support fast delivery of packets, the characteristics and construction of the physical network infrastructure plays an equally vital role.

Moreover, it is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems). Routing protocols, such as open-shortest path first (OSPF) and intermediate system to intermediate system (IS-IS), are utilized to determine MPLS traffic flow routes through the network, as well as govern the distribution of routing information between nodes of the network(s).

When a node (e.g., router) or link connecting the node to another node fails within a network, the network topology effectively changes. Consequently, the routers need to update their routing tables to establish alternative routes to the destination. This "convergence" process requires time for updating the network elements of the topological change, which can be substantial in some cases. Loop-Free Alternative (LFA) has developed as a technology that can support Fast Restoration and Reroute (FRR) to Label Distribution Protocols (LDP). The details of LFA are provided in RFC 5285, which is incorporated herein by reference in its entirety. However, it is recognized that LFA in its current form does not adequately address certain network topologies. One reason for this shortcoming is that in many practical situations (due to the special network topology), there might not be any loop-free alternate routes from a source node to a destination node. As a result, a micro-loop can exist, whereby a re-routed packet might return to the source node; it is termed "micro" because it is the smallest possible loop. LFA technologies can be rendered inapplicable to the particular network, or at best, reduce the LFA coverage area.

In certain embodiments, system 100 includes one more communication nodes configured to communicate directly or indirectly with each other, operating as Label Switching Routers (LSRs). As shown, a source node 101 can generate traffic as label distribution protocol (LDP) flows to a destination node 103. Source node 101 can be situated in the middle or core of the network 100, or (as shown) at the edge—in which case node 101 can be denoted an Edge Label Switching Router (ELSR). Typically, although not necessarily, in the scenario to be described, both nodes 101 and 103 are ELSRs, and reside in geographically remote areas. Under this scenario, traffic from source node 101 to destination node 103 can traverse a number of nodes, from a next-hop node 105 to a series of one or more nodes comprising a routing network 107. In this example, source node 101 has another next-hop node 109, which communicates with node 111. Node 111 is considered a next-next hop node with respect to source node 101.

By way of example, an enhanced loop-free alternative (ELFA) routing logic is employed within one or more of the nodes of system 100 to enable a greater LFA coverage area.

In one embodiment, the use of loop-free alternates provide local protection for unicast traffic in pure Internet Protocol (IP) and MPLS/LDP networks in the event of a single failure (whether link, node, or shared risk link group (SRLG)). This enhanced loop-free alternative approach can reduce the packet loss that can occur while routers converge after a topology change stemming from the failure. Rapid failure repair is achieved through use of pre-calculated backup next-hops that are loop-free until the distributed network convergence process completes. This ELFA approach does not require any support from other routers.

According to certain embodiments, each router forwards MPLS packets to its immediate nodes or next-hops depending on its packets' labels. For example, for packets destined to node 103, node 101 forwards the packets to node 105 which is on the Label Switched Path 113 ($LSP_1$) from node 101 to 103. As depicted in FIG. 1A, this path 113 is comprised of different sub-paths or segments such as 115 ($LSP_2$), 117, ($LSP_3$), and 119 ($LSP_4$). Each of the paths 115, 117, and 119 correspond to physical links between the corresponding nodes. Such links 115, 117, and 119 can be bi-directional, while the logical paths are typically unidirectional. It is noted that the terms "path" and "link" are generally used interchangeably, unless a particular distinction between them is specified. Under normal circumstances (e.g., when all the nodes and associated links are active and functioning properly) the path $LSP_1$ is typically pre-calculated based on shortest paths algorithms by determining a path from node 101 to 103 with minimum associated transmission cost, for example. The cost can be based on any one or number of metrics (or factors) such as the time to travel, actual leasing expenses, bandwidth, etc. Of course, paths with higher costs might exist that do not include the node 105 or path 121 ($LSP_5$). For example, $LSP_5$ is another path from source node 101 to destination node 103, passing through nodes 107 and 109, among others; and the path 121 includes sub-paths 123, 125, 127, and 119. The path 121, however, is not the shortest or optimum path from source node 101 to destination node 103.

It is contemplated that other arrangements or topologies may be utilized by system 100. Furthermore, the links such as 115, 117, 119 may include both wired (e.g., coaxial cable, twisted pair, fiber optic cable, etc.) as well as wireless connections.

As mentioned, each of the nodes, in particular, router 101 might include an Enhanced Loop-Free Alternate (ELFA) routing logic 129, which enables a node to re-route its packets to alternate routes in the case there is failure on the paths of its forwarded packets. Under the scenario of FIG. 1A, source node 101 employs logic 129. Using this logic, for example, in case link 115 or node 105 fails, source node 101 might forward packets destined to node 103 via the next-hop node 109, rather than the pre-designated node 105.

The above arrangement involves normal operations for system 100. However, upon occurrence of a link failure between the source node 101 and the pre-designated next-hop node 105, system 100 needs to recover from such failure, as next explained.

As shown in FIG. 1B, the paths $LSP_1$ and $LSP_2$ are not functional. Therefore, source node 101 cannot forward packets destined for destination node 103 to node 105. Typically, through different means (e.g., network management system (not shown)), source node 101 as well as other nodes within system 100 may become aware of the failure of the link 115 or node 105. Upon acquiring such knowledge, the nodes can re-calculate the routes and update their routing tables accordingly. As mentioned, this process requires a certain amount of time to complete; but, during this convergence, it is important to maintain the traffic flow with minimum interruption.

By way of example, the Loop-Free Alternate (LFA) routing algorithm can be utilized to ensure the flow of packets from source node 101 are not lost during this time, as system 100 is learning the new topology. To avoid link 115 or router 105 being included in the new alternate route can follow the LFA scheme. However, the new path should not contain any loops, meaning that after the packet is re-routed from the source node 101 to a particular node within the new path, the shortest path from this particular node to the destination node 103 should not include the source node 101.

For example, an alternate path could be path 121 $LSP_5$. However, this path contains a micro-loop 131, thereby rendering the LFA procedure inapplicable. In one instance, it is assumed that (except the micro-loop 131) there is no other loop in path $LSP_5$ and the path has no intersections with link 115 (or node 105 if the failure concerns the node 105). If node 101 redirects packets destined for node 103 via next-hop node 109 rather than next-hop node 105, the total cost associated with path $LSP_5$ is higher than the cost associated with $LSP_3$ followed by $LSP_1$. Consequently, node 109 will forward the received packet from node 101 back to node 101. That is, because immediately after the occurrence of the failure in link 115 or node 105, node 109 will have no information to update its routing tables. Moreover, the label on the forwarded packets to node 109 will have no such information. Therefore, since node 109 will forward the packet back to source node 101 (i.e., micro-loop), the packet may not reach the destination in a desired time, or is dropped.

At this point, the Enhanced LFA routing logic 129 (as more fully described below) will enable or "deceive" the next-hop node 109 to forward the received re-routed packet from node 101 to node 111; hence, the micro-loop is "broken" so that the traffic can follow another path to the destination node 103. It is contemplated that one or more of the nodes in system 100 can be configured with EFLA logic 129.

Figure 2:
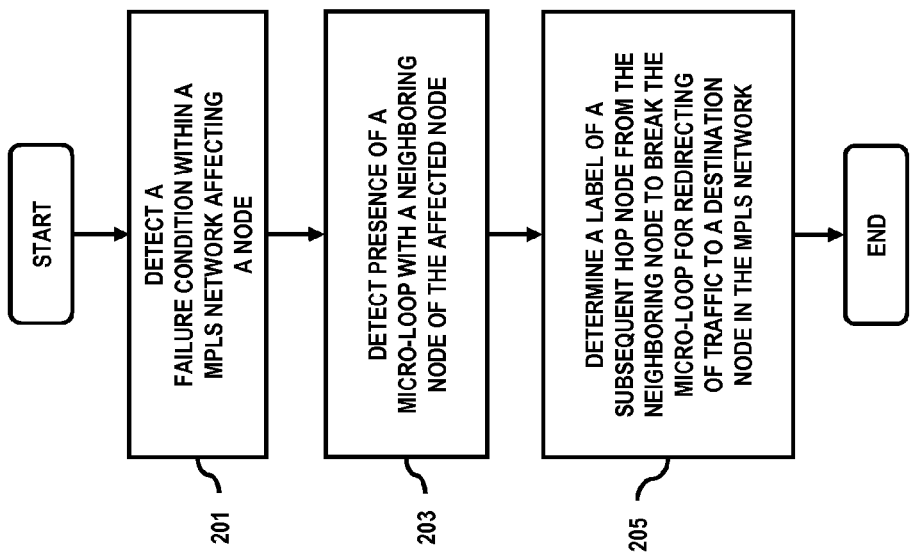
FIG. 2 is a flowchart of a process for providing fast network recovery, according to one embodiment.

FIG. 2 is a flowchart of a process for providing fast network recovery, according to one embodiment. Continuing with the example of system 100 under the link failure condition shown in FIG. 1B, a link failure affecting a node is detected, per step 201. In step 203, presence of a micro-loop with a neighboring node (e.g., next hop node 109) of the affected node (e.g., source node 101) is detected. The process then determines, as in step 205, a MPLS label of a subsequent hop (that will not create a loop with respect to the affected node) from the neighboring node 109 to break the micro-loop for redirecting of traffic to the destination node 103 in the network 100. In this example, the subsequent hop node is the next-next hop node 111.

The MPLS label for breaking the micro-loop, according to certain embodiments, possesses a stacked structure with an outer label and an inner label. For example, the ELFA logic 129 can generate a first MPLS label specifying the next-next hop label, as well as a second MPLS label specifying the destination node. The labels can then be included in the traffic for forwarding to the neighboring node 109, whereby the first MPLS label (indicating the next-next hop node 111) can be the outer label and the second MPLS label (specifying the destination node 103) can serve as the inner label. If multiple subsequent hops that are loop-free (e.g., next-next hop nodes) exist, ELFA logic 129 may select the subsequent hop exhibiting the shortest path. However, it is contemplated that other factors can be used to select the appropriate subsequent hop.

Figure 3A:
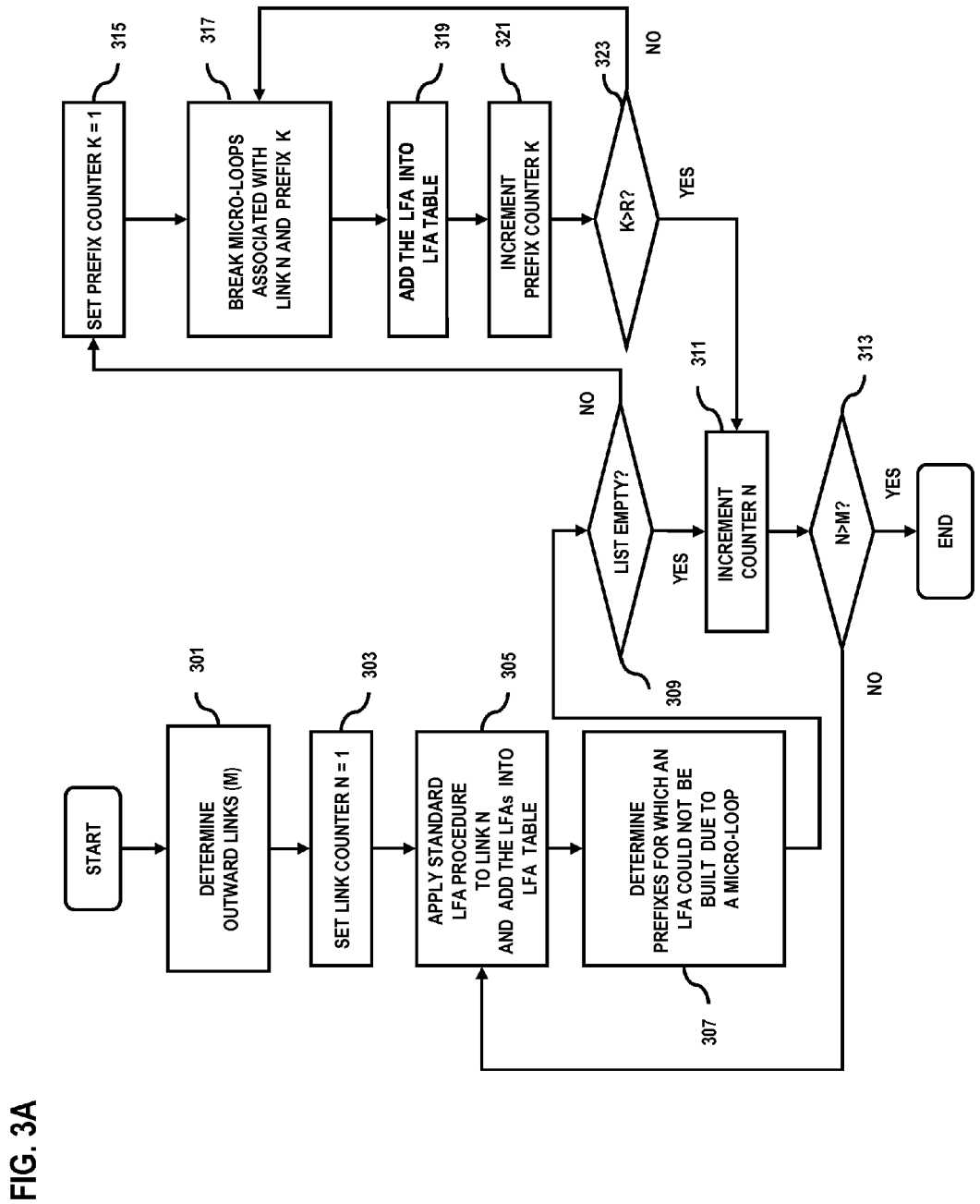
FIGS. 3A-3C are flowcharts of an Enhanced Loop-Free Alternate (ELFA) routing process for network recovery, according to some exemplary embodiments.
Figure 3B:
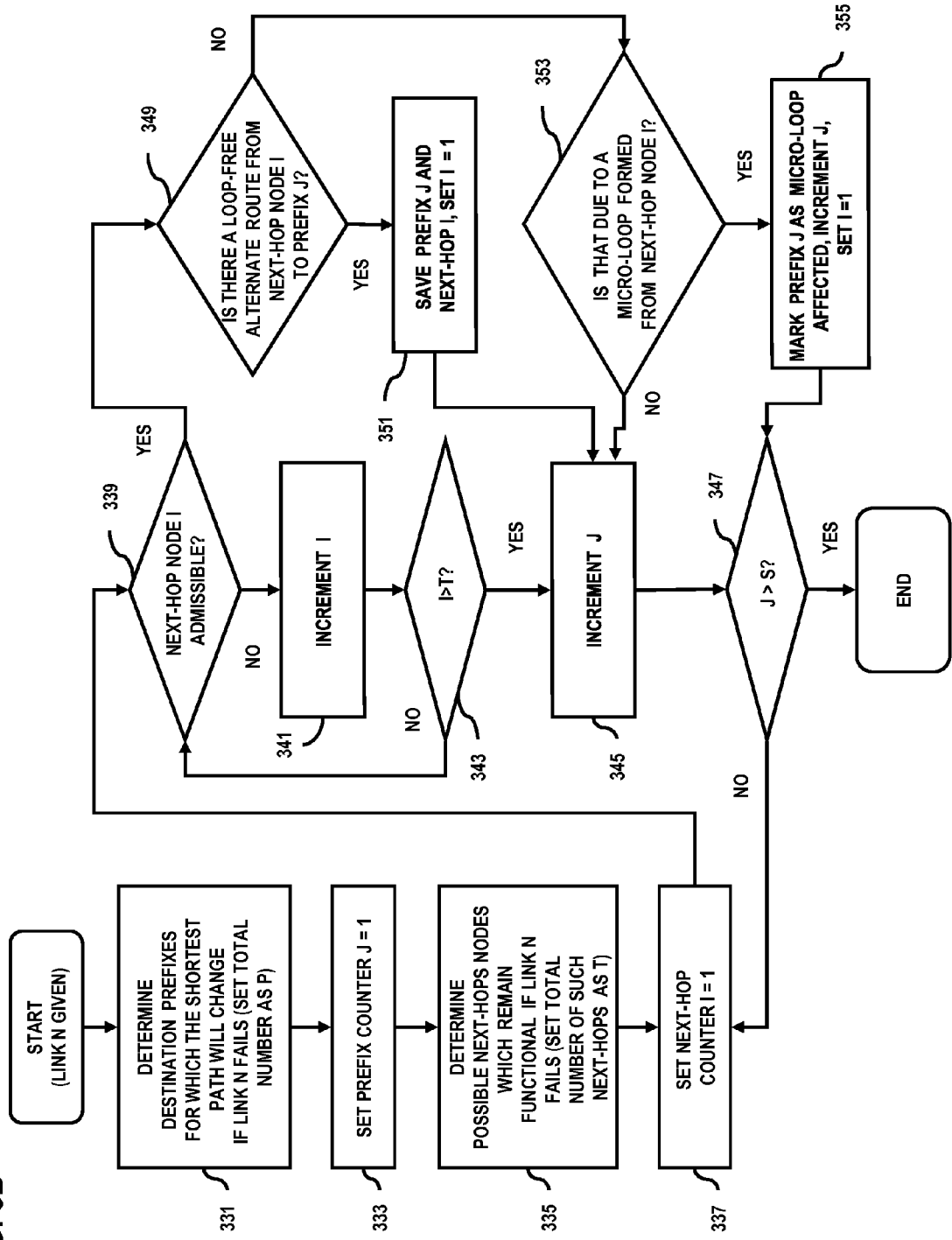
Figure 3C:
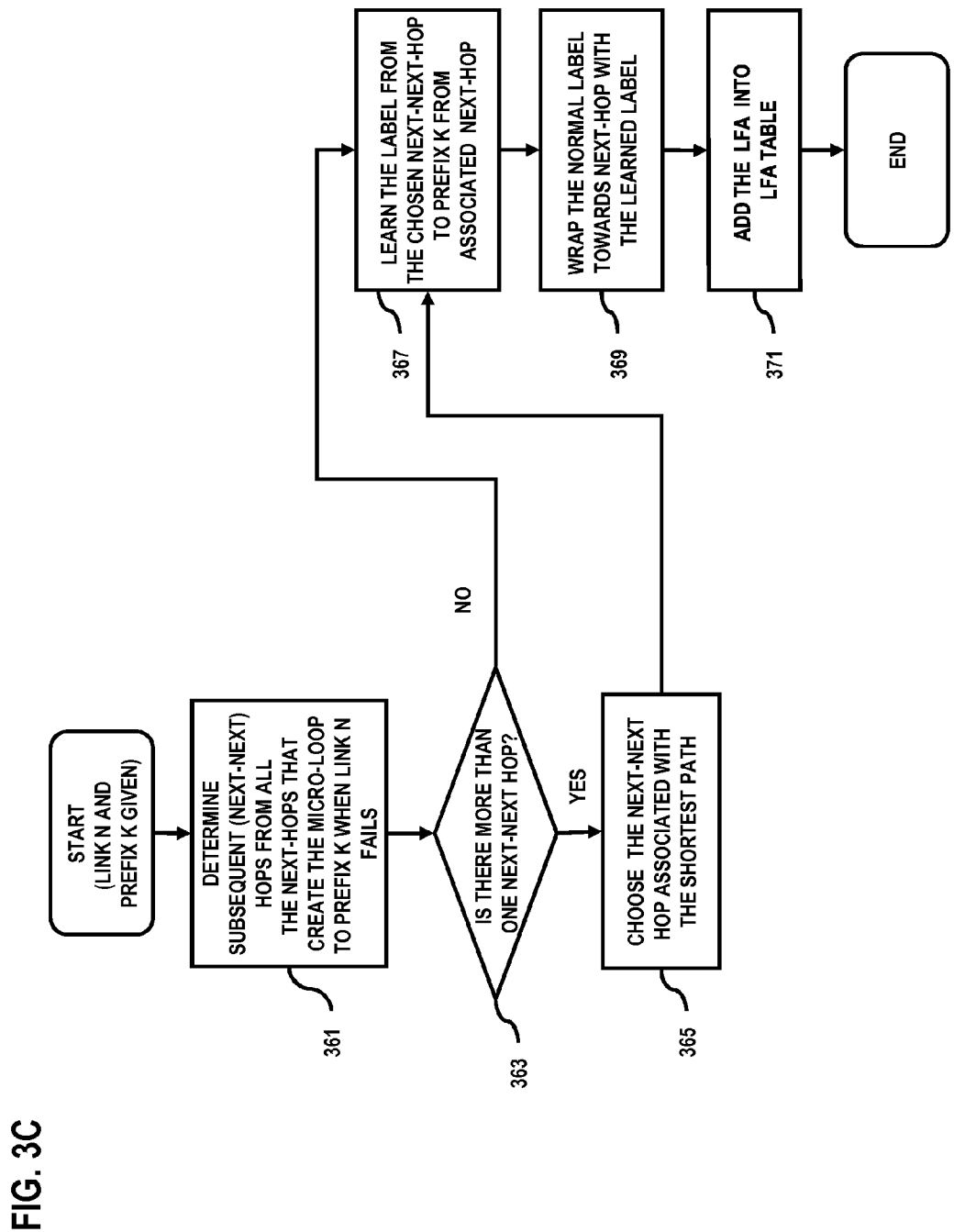

FIGS. 3A-3C are flowcharts of an Enhanced Loop-Free Alternate (ELFA) routing process for network recovery, according some exemplary embodiments. In certain embodiments, this process can be performed either on-line or off-line and the resultant labels are stored in an LFA table, and in the case of a failure, the related label will be used from the LFA table.

In step 301 of FIG. 3A, the ELFA logic 129 determines all the links out of the source node 103; the total number of such links is denoted as M. Thus, each link can be designated from 1 to M. In step 303, a Link Counter is set to N=1. In step 305, according to one embodiment, an LFA algorithm, as described in RFC 2586, can be applied to link N; and the results are stored in the LFA table. Details of the LFA scheme is described with respect to FIG. 3B.

As mentioned, the standard LFA procedure is not able to find an alternate path for a prefix (or destination node) that has an associated micro-loop. For example, the prefix associated with destination node 103 from the source 101 in FIG. 1B, where the micro-loop 131 could not be broken by the standard LFA logic, and hence no alternate path will be established. However, the ELFA logic 129 addresses this deficiency by breaking the micro-loop, as now described.

In step 307, the ELFA logic 129 determines all the prefixes for which the standard LFA mechanism could not build an alternate path due to micro-loops involving link N for certain embodiments depicted. It is noted that basic LFA can provide approaches for the micro-loop by either changing topology or IGP metric; however, such mechanisms are not practical for the scenario described in this example. The determined prefixes can be in form of a list. R denotes the total number of such prefixes. If the list is empty (as determined in step 309), then Link Counter N is incremented, per step 311. If N is not larger than M, the total number of links out of the source node, the procedure (per step 313) returns back to step 305. If in step 309, the list is not empty, then in step 315, Prefix Counter K is set to 1; and the procedure of breaking the micro-loops is applied.

According to some embodiments, the one or more micro-loops associated with Prefix K and link N are broken, as in step 317. The procedure to break such micro-loops involve the use of a stacked labels. After the micro-loops are broken, a new Loop-Free Alternate route is created and added to the LFA table, as in step 319. In step 321, Prefix Counter K is incremented; and if the all the R Prefixes are not exhausted (as determined in step 323), the procedure repeats steps 317-321 for the new prefix. Otherwise, the process returns to step 311 once all the prefixes are processed.

FIG. 3B illustrates a flowchart for a basic Loop-Free Alternate (LFA) routing procedure that can be utilized with the enhanced LFA process of FIG. 2A. For illustrative purposes, the LFA procedure is explained with respect to the mechanism defined in RFC 5286.

In certain embodiments, this basic LFA procedure can be executed by any node of the network 100. An outward link (with respect to the calculating source node 101) is given as an input to the procedure. Such link can be denoted as Link N. The procedure attempts to find an LFA route to any destination prefix for which the normal optimal shortest path from the calculating node passes through Link N. This path can be affected by either the failure of Link N or the node it corresponds to. In step 331, one or more (e.g., all) destination prefixes for which the shortest path will change if Link N fails, are determined. The total number of such prefixes is set as P. The prefix counter J is initialized (e.g., set to 1), as in step 333.

In step 335, the process determines one or more possible next-hops (with respect to the calculating node) which remain functional if Link N fails. The total number of such next-hops is denoted by T. In step 337, the next-hop counter I is initialized to I=1. In step 339, is the process checks whether the particular next-hop is admissible. In this step various issues about the Next-Hop I could be checked; for example, if there is an administratively allowed route to the corresponding node or if the cost to transmit to the node satisfies a predetermined threshold value (e.g., cost exceeds a certain amount). If the Next-Hop I is not admissible, then in step 341, next-hop counter I is incremented; and in step 343, the process determines whether I is larger than T, the total number of Next-Hops. If I>T, then in step 345, J is incremented per step 345, otherwise the procedure returns to step 339. In step 347, the process determines whether J>P; in which case the procedure stops, otherwise the process returns to step 337.

In step 349, the process checks whether there exists an LFA to the prefix J wherein the LFA uses Next-Hop I. Any variety of approaches can be utilized to perform this check. One approach is to determine whether the (optimal) transmission cost from Next-Hop I to Prefix J is less than the sum of the (optimal) cost from Next-Hop I (back) to the calculating node and the (optimal) cost from the calculating node to the destination Prefix J. If this condition is satisfied, a loop-free alternate route from the calculating node to the Prefix J exists, and such a node could be used, at least, in case the Link N fails. In fact, such a route can be used when the node associated with Link N also fails. Upon finding such a route, in step 351 the Prefix J and Next-Hop I are saved for later use and Next-Hop counter I is initialized to 1 again, and the procedure goes back to step 345.

In case no LFA could be found in step 353, it is determined whether this is due to existence of a micro-loop from Next-Hop I back to the calculating source node. This determination could be made for example based on whether there is a next-hop to Next-Hop node I (such as Q) from which the cost to destination Prefix J is less than the sum of the cost from Q to the calculating source node and from the calculating source node to the destination Prefix J. If that is the case, then in step 355, the Prefix J and Next-Hop node I are marked as micro-loop affected; and consistent with the process of FIG. 3A, this information is be used to implement the EFLA logic. If such a micro-loop does not exist then the procedure returns to step 347.

FIG. 3C depicts the flowchart of an example of a micro-loop breaking procedure, according to some embodiments. It is understood that the steps shown could be implement in different equivalent manners. The described procedure generates labels to establish an optimum micro-loop free alternate route associated with failure of Link N, from the source node to the Prefix or node K.

In step 361, the process determines loop-free subsequent hops (e.g., the Next-Next-Hops (NNHs) in the exemplary scenario of FIG. 1B) from all the Next-Hops (NHs) that create micro-loops on the path to Prefix K. These loop-free subsequent hops are listed and numbered. As depicted in the network 100 of FIGS. 1A and 1B, there is only one micro-loop on path $LSP_3$, and the Next-Hop and Next-Next-Hop with respect to source node 101 are immediately recognized as nodes 107 and 109. In step 363, the process determines whether there are more than one micro-loop. If there is only one micro-loop, then the Next-Next-Hop is identified immediately and the label to the Next-Next-Hop from the Next-Hop should be learned.

If there is more than one micro-loop, then a shortest path algorithm can be executed, as in step 365, to find the shortest path. Therefore, the corresponding optimal Next-Hop and the Next-Next-Hops can be determined.

In step 367, the source node learns the label that its Next-Hop can use to forward a packet destined to Prefix K (e.g., node 103 in FIG. 1B), on a path from the Next-Hop to the destination node 103, wherein the path includes the Next-Next-Hop node. In other words, this label is simply the label which Next-Next-Hop requires the Next-Hop to use so that a packet from Next-Hop is forwarded to Prefix K. It is noted that, in certain embodiments, LDP Label Liberal Retention Mode on the routers is activated as usual. According to certain embodiments, a stack of two labels is created; the stack is comprised of a first label that is the normal label used from the source node 101 to Next-Hop as the destination, and a second label which is the learned label (step 369). By way of example, the first label can be on top of the second label, meaning when a packet containing the created stack reaches the Next-Hop node, at the Next-Hop the first label will be popped out and the second label will on top of the labels stack. Such a packet will then be forwarded by the Next-Hop to the Next-Next-Hop. In step 371, the newly established ELFA path is added to LFA table, and the micro-loop breaking procedure is stopped.

To further illustrate the EFLA mechanism and its benefits, an exemplary scenario is described with respect to FIGS. 3A-3F.

Figure 4A:
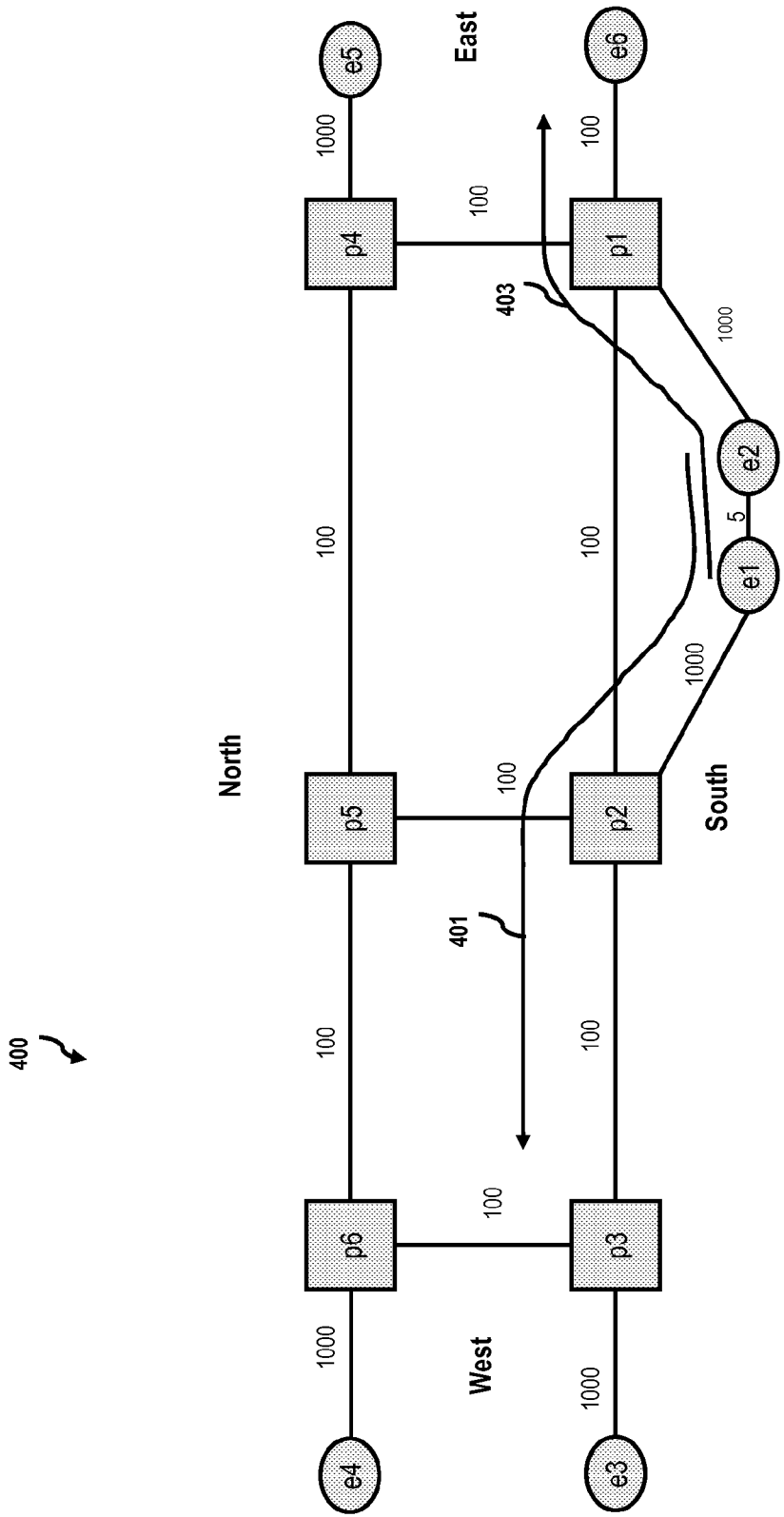
FIGS. 4A-4E are diagrams depicting an exemplary Multiprotocol Label Switching (MPLS) network configured to recover from a link failure, according to an exemplary embodiment.

FIGS. 4A-4E are diagrams depicting an exemplary Multi-protocol Label Switching (MPLS) network configured to recover from a link failure, according to an exemplary embodiment. In particular, FIG. 4A shows a common network topology for a network Service Provider (SP), which manages, for example, an MPLS-based Virtual Private Network (VPN). The nodes, e1, e2, e3, e4, e5, and e6, are Edge SLRs residing at the edges of the network 400. In this case, such a node is usually called Provider Edge (PE), while the router p1, . . . , p6 are called Provider (P) core routers. The cost associated with each link is shown next to the link.

FIGS. 4A-4F are diagrams depicting an exemplary Multi-protocol Label Switching (MPLS) network configured to recover from a link failure, according to an exemplary embodiment. In the example depicted in FIG. 4A, e1,e2 are PEs connected in the same site; and p1, p2, . . . are P core routers situated at different sites geographically. In order to guarantee the lowest latency from/to all other remote PEs, normally the shortest path follows the geographical distance of the site locations. Therefore, as part of the cost assignments to the various communication paths, a lower Interior Gateway Protocol (IGP) metric has to be assigned between e1 and e2 to ensure the following:

A. A path 401 for the traffic from e1 and e2 destined to the West traverses e2-e1-p2-p3- . . . .

B. A path 403 for the traffic from e1 and e2 destined to the East traverses e1-e2-p1- . . . .

Moreover, to avoid any P core traffic re-route via PEs, a high IGP metric is applied to the PE uplinks, unless the network is segregated by OSPF area or ISIS level.

Figure 4B:
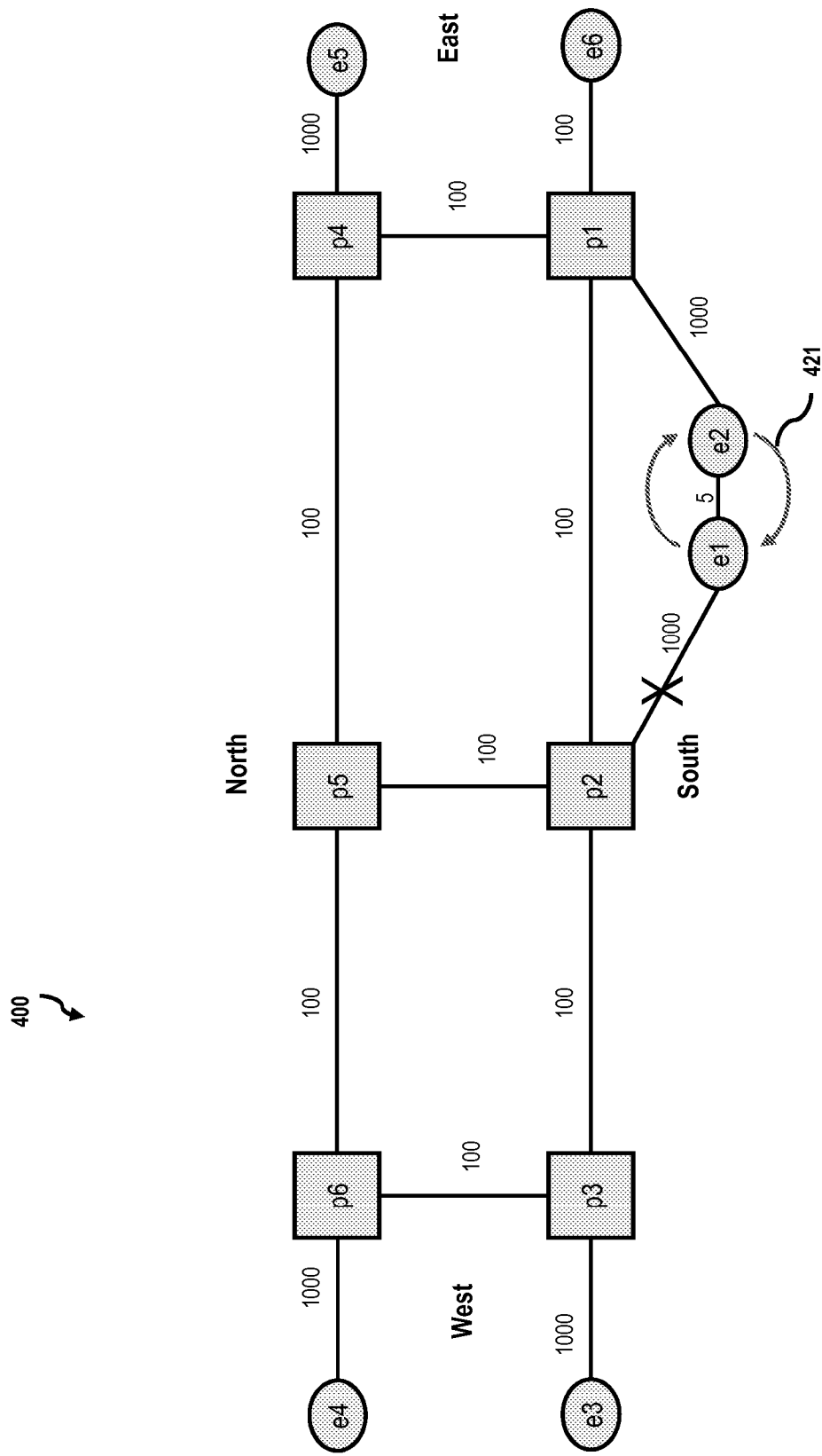
Figure 4C:
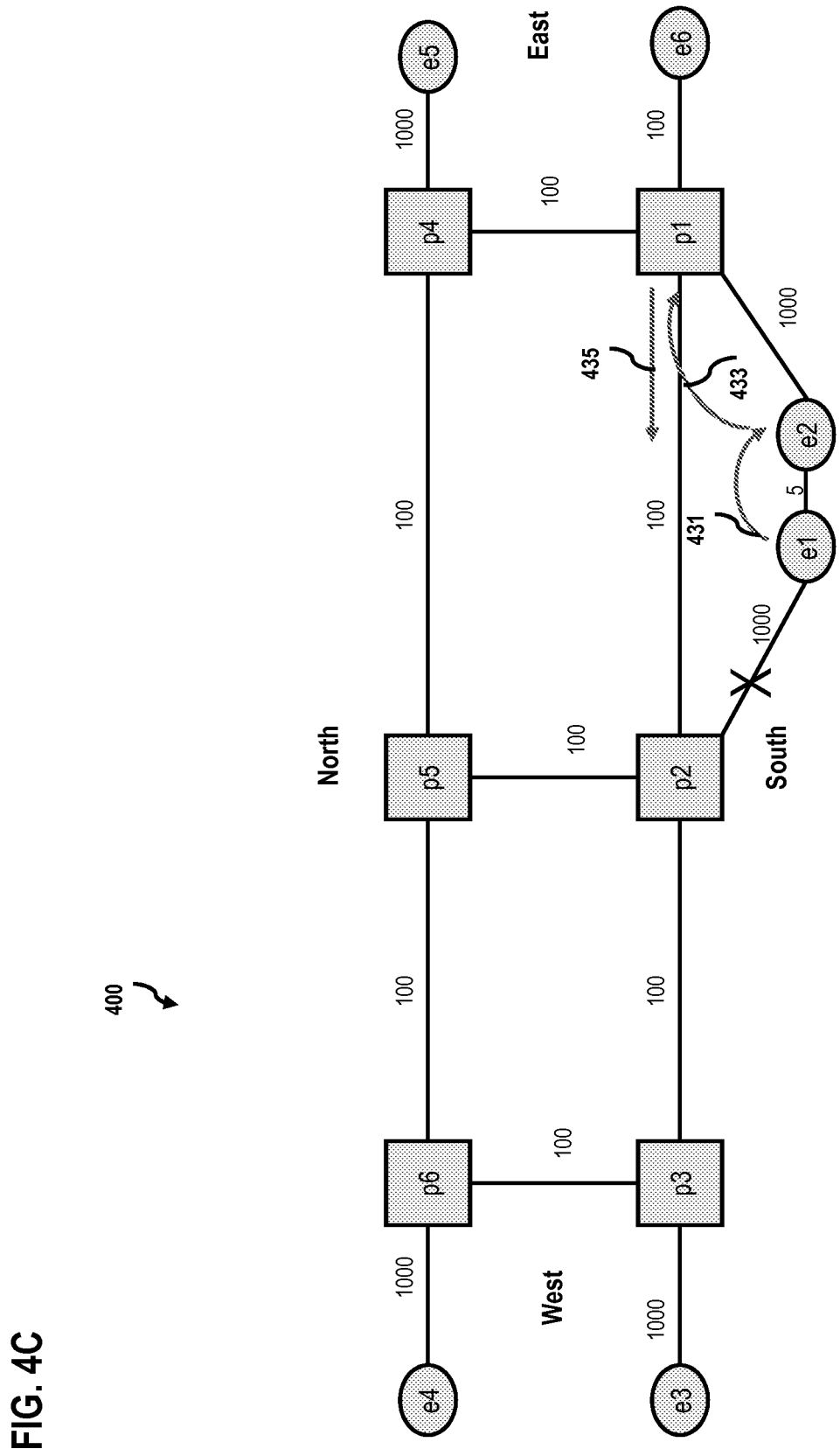

As shown in FIG. 4B, network 400 experiences a failure; in this example, the link between e1 and p2 has failed, rendering it non-functional. Because e1 and e2 are mutually the next hop for each other for the traffic in the opposite direction, such as from e1 to e6 verses from e2 to e3, when e1-p2 or e2-p1 link fails, a micro-loop 421 arises between e1 and e2 (under the basic LFA scheme). It is noted that when traffic from e1 to West through link e1-p2 is redirected to e2, e2 sees traffic to the West, and then node e2 automatically forwards the traffic back to e1, as e1 is e2's next hop to the West (i.e., the shortest path from e2 to West passes through e1, according to the weights shown). The following issues are observed. If a high IGP metric is assigned to the link e1-e2 (higher than that on p1-p2), then the normal traffic performance (traffic latency) would be impacted. If two additional links, such as e1-p1 and e2-p2 are added, higher costs can be incurred.

According to some embodiments, by employing the EFLA process (as described in FIGS. 3A-3C), when e1 learns the failure of link e1-p2, e1 redirects its packets destined to e3 to e2, and then node e2 would forward the traffic to the Next-Next Hop p1. To break the micro-loop, instead of showing the real traffic destination such as e3, e1 appends a stack of two labels to each packet, according to one embodiment.

The EFLA logic of router e1 achieves this micro-loop breakage, according to some embodiments, by pushing two MPLS outer labels onto the label stack in each packet destined to e3. The most outer label is the one targeting p1 to "trick" e2, and the (second) inner label is the one to the real destination e3 from p1. Node e1 could learn the second label (which is the label p1 requires e2 to use to send a packet to e3 through p1) using any known label learning protocol between e1 and e2. The new two hops 431, 433 from e1 to e2 and from e2 to p1, respectively, are depicted in FIG. 3C. In this example, hop 435 is the next-next-next hop from p1 to p2.

Figure 4D:
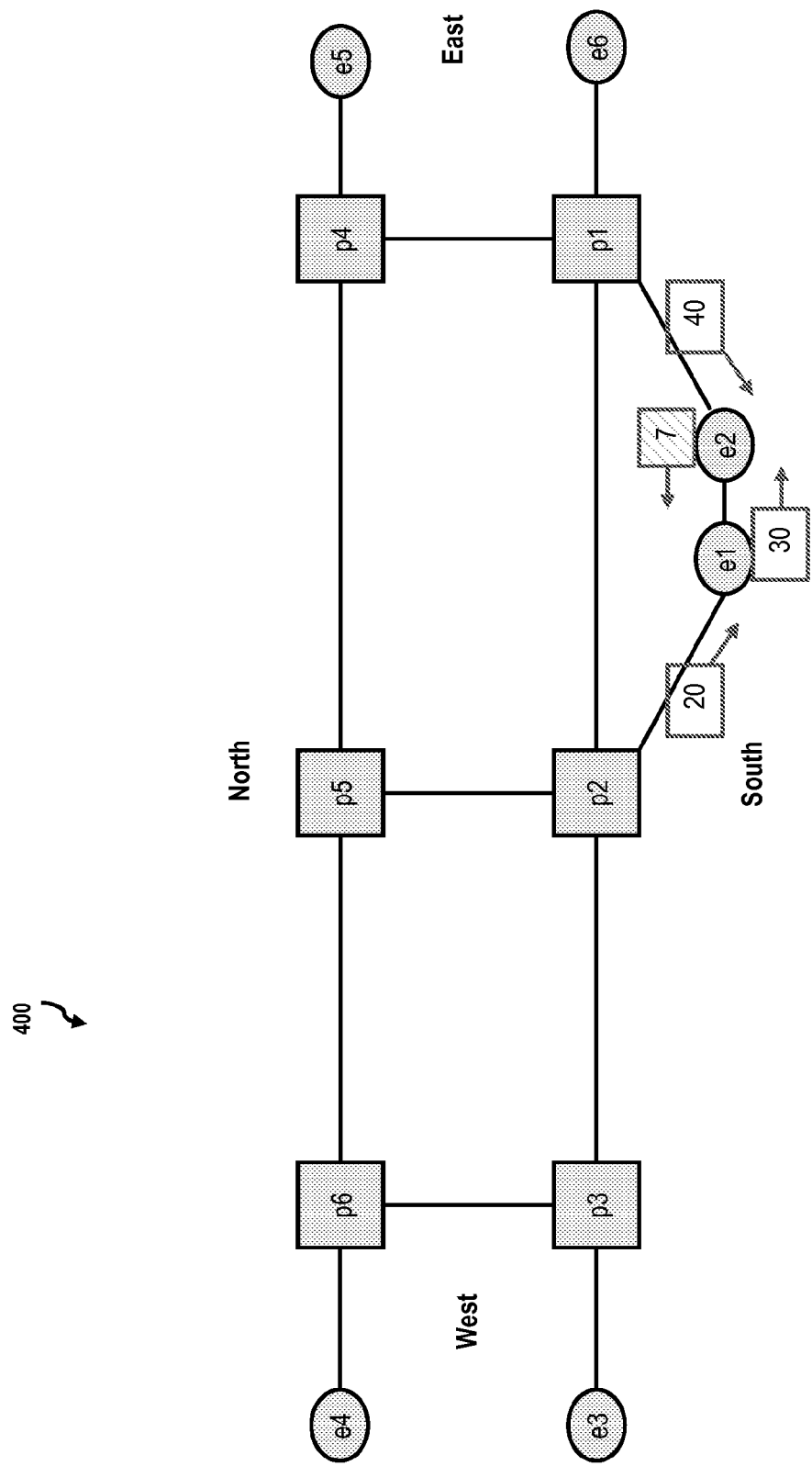

FIG. 4D shows the different labels which the routers e1 and e2 use. By way of example, to reach e3: p2 requires e1 to use label [20]; e1 requires e2 to use label [30]; p1 requires e2 to use label [40]. Further, to reach p1, e2 requires e1 to use label [7].

Figure 4E:
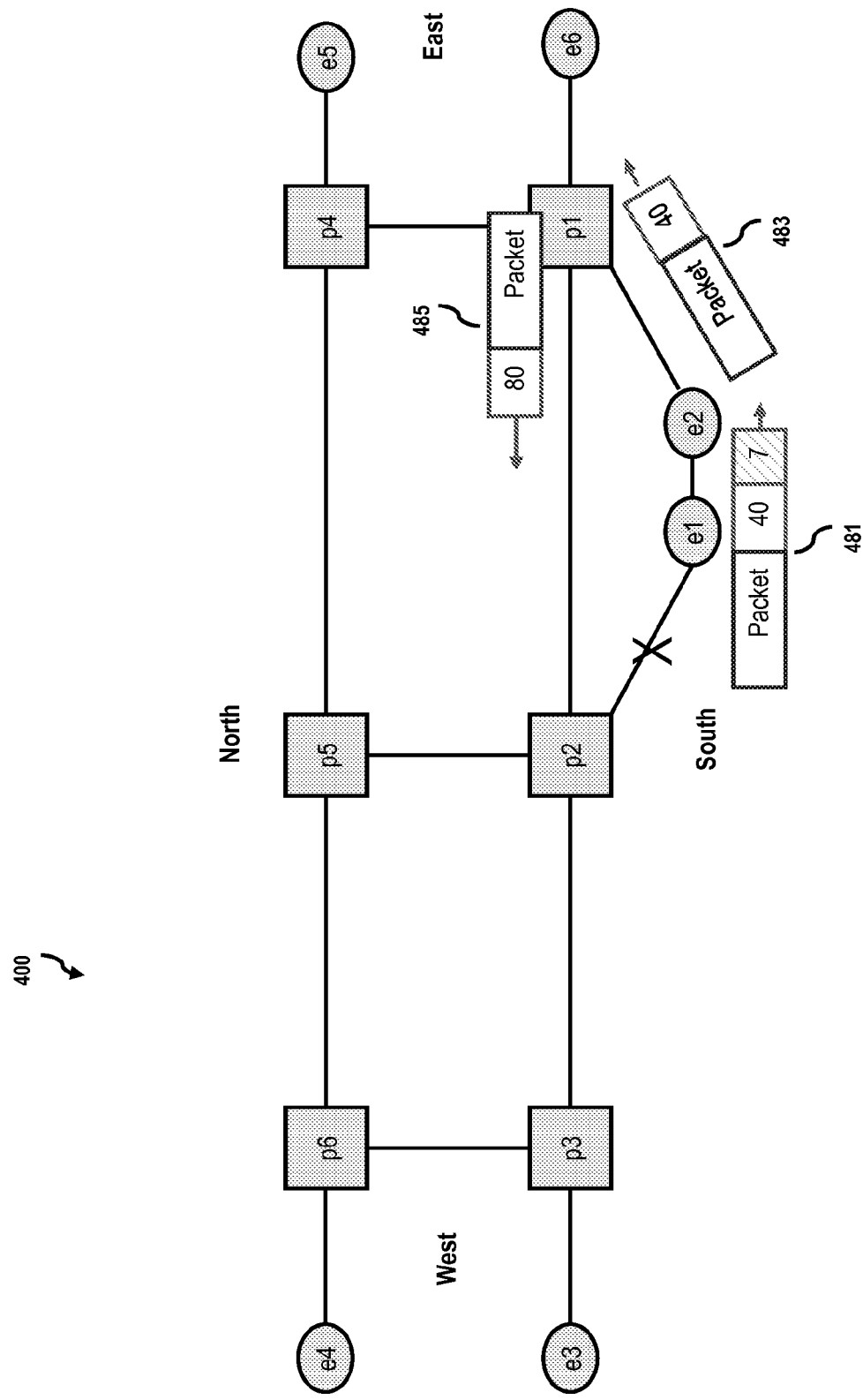

FIG. 4E illustrates the flow of a packet from e1 to e2 to p1 and to p2 after the EFLA logic (which can reside in node e1) applies the EFLA process. Packet 481 has a stack of two labels. The outer label [7] is used to "deceive" node e2 and label [40] is the one p1 requires e2 to use in order to forward a packet from e2 to e3. Upon receiving the packet, e2 will pop off label [7] and forward packet 483 (which has been stripped of the outer label) to p1 because of the "penultimate hop." It is noted that e2 will not examine label [40] in packet 481, since it is not on top of the stack. Upon receiving packet 483, p1 will process the label [40]; e2 swaps that label with label [80], which is the label that p2 requires from p1 to forward packet 485 to e3.

Figure 5:
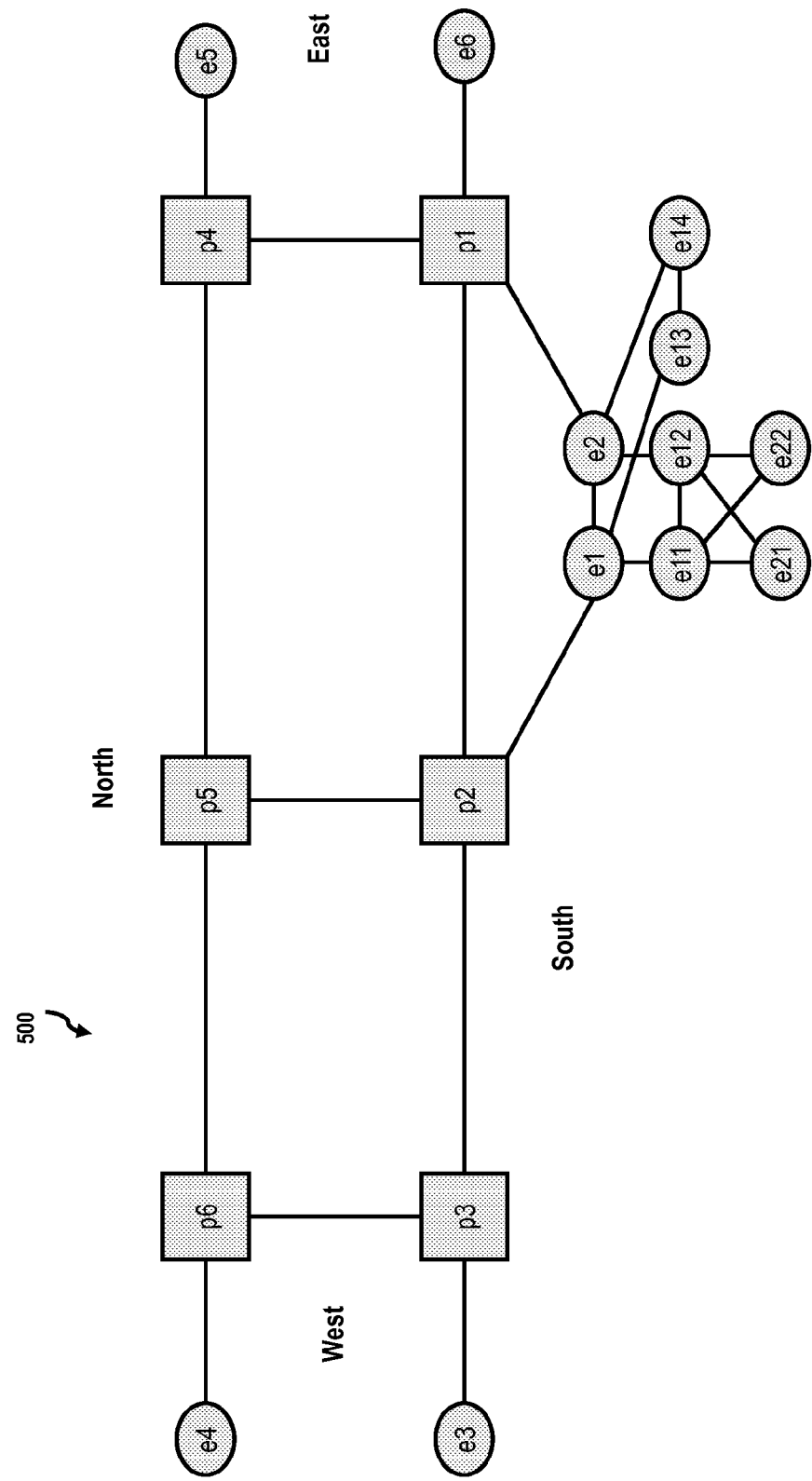
FIG. 5 is a diagram of an MPLS network topology involving a cluster of premises equipment, according to an exemplary embodiment.

FIG. 5 is a diagram of an MPLS network topology involving a cluster of premises equipment, according to an exemplary embodiment. FIG. 5 shows a different network 500 in which the topology involves a cluster of edge nodes. As with the example of FIGS. 4A-4E the described ELFA mechanism can be utilized, while the traditional LFA would have failed to restore the network 500 due to micro-loops in case the path e1-p2 or e2-p1 fails. In the topology shown, PE routers e1 and e2 act as traffic aggregators for the site including the PE routers e11, e12, e21, e22, e13, and e14. By breaking the micro-loops, the LFA coverage area is effectively expanded.

Figure 6A:
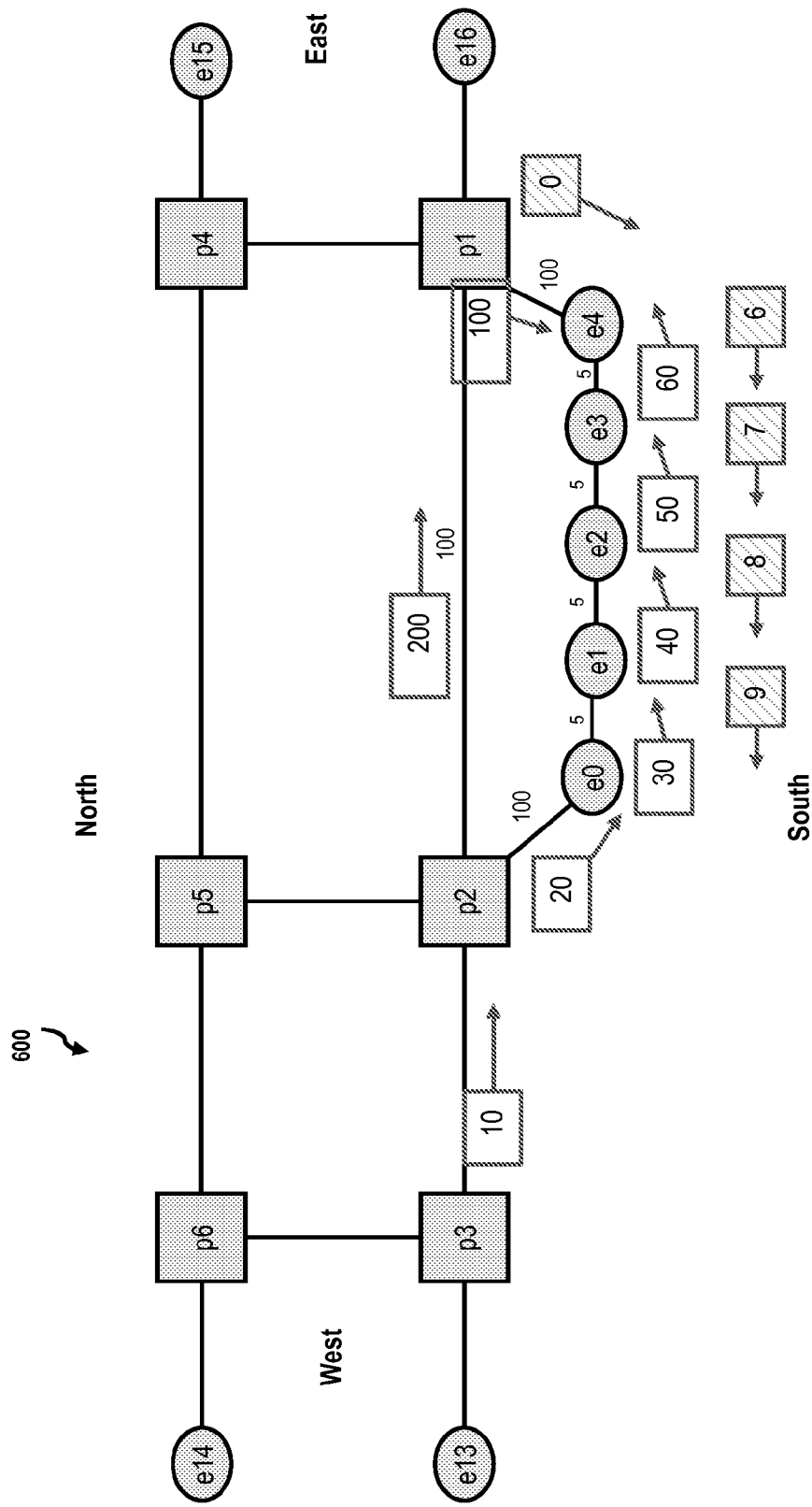
FIGS. 6A-6C are diagrams of an MPLS network and associated process for providing rapid network recovery for a topology involving a macro-loop, according to an exemplary embodiment.
Figure 6B:
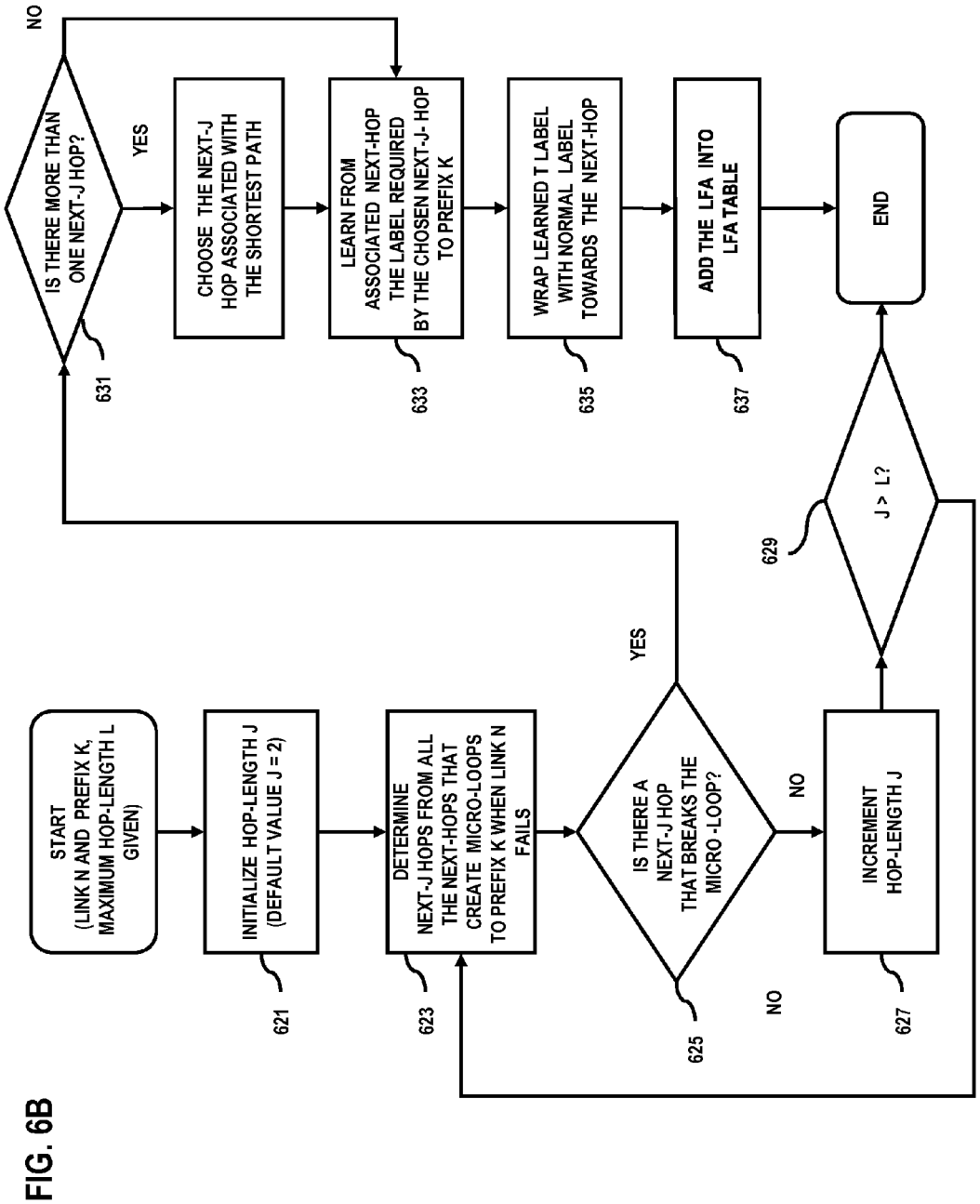
Figure 6C:
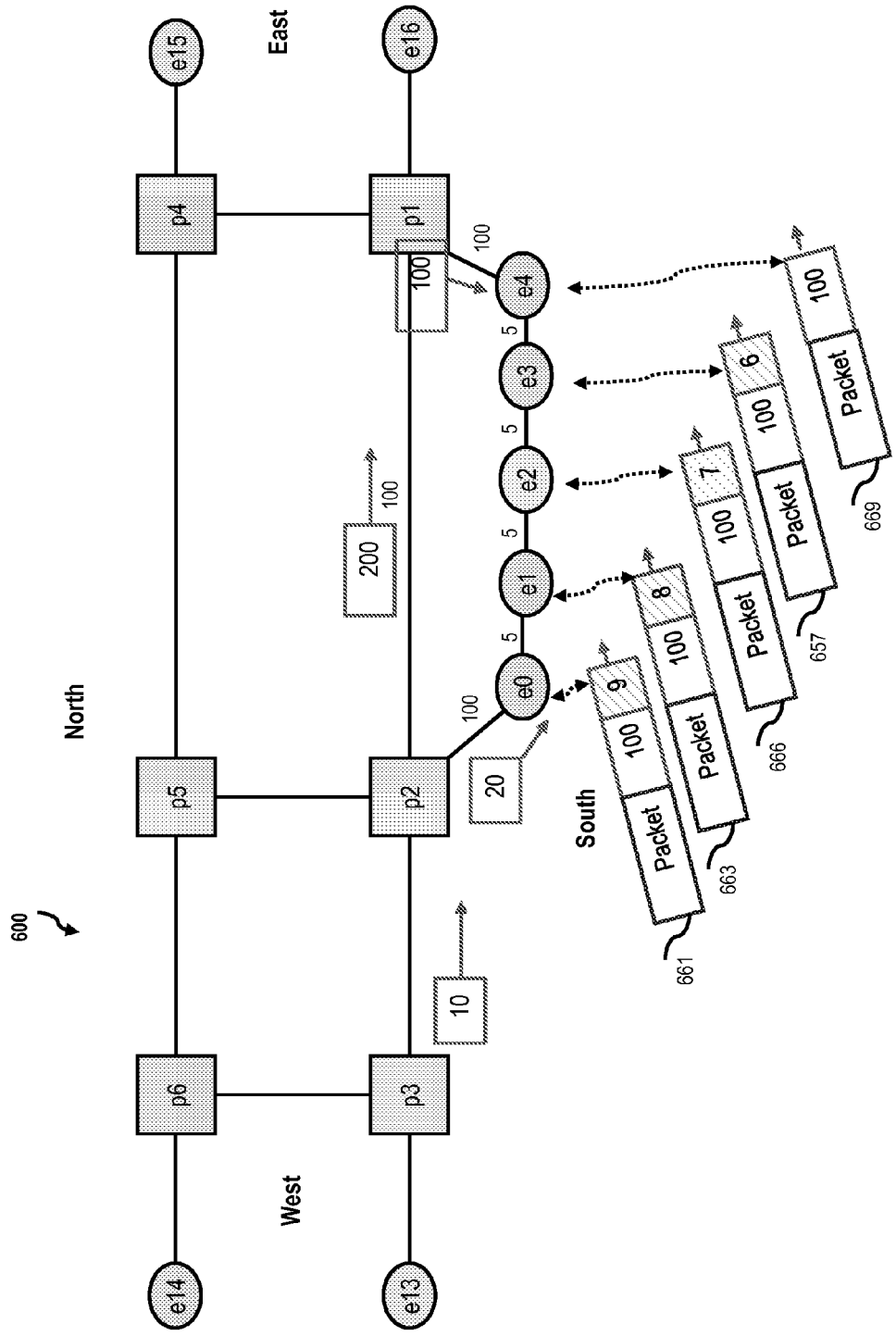

FIGS. 6A-6C are diagrams of an MPLS network and associated process for providing rapid network recovery for a topology involving a macro-loop, according to an exemplary embodiment. As seen in FIG. 6A, network 600 includes a chain of PE's: e0, . . . , e4 as well as e13-e16. That is, PE routers e0, . . . , e4 comprise a chain and are located in the same site, and hence are geographically close to each other. P routers, which are core routers, include p1, . . . , p6. Therefore, in case either of the links e0-p2 or e4-p1 fails, there will be a micro-loop for packets to the West or East, respectively. In fact, a series of micro-loops constituting a macro-loop can occur. Under normal circumstance, traffic from e0, e1, e2, e3, e4, p1 to e13 will have outer labels of [20], [30], [40], [50], [60], [100], and [200] respectively. Traffic from e0, e1, e2, e3, e4 to p1 will use outer label of [9], [8], [7], [6], and [0].

With respect to the micro-loop breaking procedure, it is noted that, in FIG. 6A, for the case link e0-p2 fails, e0 should learn the label required by p2 to forward a packet received from last node of the chain (which is e4) to e13. In this manner, e0 could break the micro-loop by pushing two labels into the label stack of any packet destined to e13 (e0 wraps the learned label by the normal label towards e1).

By way of example, FIG. 6B shows a process for breaking a micro-loop, wherein a multi-hop node is found that will not result in a loop. By sending a packet to that node, it is guaranteed that the packet will not return back to the source node. In FIG. 6A, node p1 is a proper subsequent node with respect to node e0 (and e1-e4). It is contemplated that this proper subsequent node could be found according to various methods. Link N, Prefix K, and Maximum-Hop-Length L are defined for this procedure. The Maxim-Hop-Length L, for example, could be the length of the chain in FIG. 6A minus one. In step 621 the Hop-Length J is initialized. The default value could be J=2; however, other values are also possible. For example, if there is already a chain of length C, then J=L=C−1 could be a candidate. In the example of FIG. 6A, the chain length is 5, in which case the procedure might look for only multi-hops of length J=4 starting from the Next-Hop with respect to node e0—that is, a multi-hop starting from e1 and ending at p1. In step 623, nodes reachable by multi-hops of length J (multi-hops starting from the node associated with the Next-Hop) are determined. In step 625, the process determines whether among these listed nodes (or equivalently the hops), there is a proper subsequent node, such as p. In other words, if the source node sends a packet destined to the destination to p, then p will not return the packet back through the incoming route, but instead will forward it through a route that does not involve the source node or the failed link. For example, the subsequent node for e0 in FIG. 6A, as explained before would be p1, which is at the $4^{th}$ hop from the Next-Hop with respect to e0. If there is no such subsequent node, then in step 627 the hop-length could be incremented to search for longer multi-hops. If no such multi-hop of length L exists, then the procedure will terminate in step 629. In step 631, a determination is made whether there are more than one candidate hops of length J (or their associated subsequent nodes—); if that is the case then, in step 633 among such nodes the one which lies on shortest path from the source to the destination is chosen.

Upon choosing a proper subsequent node per step 635, the source node learns the label which the proper subsequent node requires from the node prior to it in order to forward a packet to the intended destination. For example, in FIG. 6A, the node prior to the proper subsequent node p1, is e4, and e1 has to learn the label which p1 requires from e4 to forward packet from e4 toward e13.

In step 637, the source node has to create a stack of two labels, similar to the previous case in FIG. 3B. Here, the first label (the inner label) is the learned label and the second label (the outer label) on top of it is the label that Next-Hop to the source requires to forward a packet toward the proper subsequent node.

By way of example, FIG. 6C illustrates the flow of a packet destined to e13 and when the link e0-p2 has failed. As explained previously, p1 requires e4 to have label [100] label to forward a packet from e4 to e13. According to some embodiments, e3 learns the mentioned p1's required label ([100]) from e4, and then e2 learns it from e3, e1 learns it from e2, and finally e0 learns it from e1. Consequently, source e0 builds a stack of two labels as shown in FIG. 6C and prefixes a packet 661, as shown in. Label [9] is the label e1 requires from e0 for forwarding a packet to p1. This label sits on top of the learned label [100]. It is noted that as packet 661 passes through the nodes e1, e2, e3 in the chain, the outermost label changes to [8], [7], [6], respectively, but the inner label is fixed as [100]. In e4 the label [0] is popped off and label [100] will be on top of the stack. After the packet is received at node p1, label [100] is swapped with [200], which p2 requires for forwarding a packet to e1.

The above processes and arrangements, according to certain embodiments, advantageously enable rapid restoration of network failures by extending the LFA scheme.

The processes described herein for providing an enhanced LFA scheme for network recovery may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
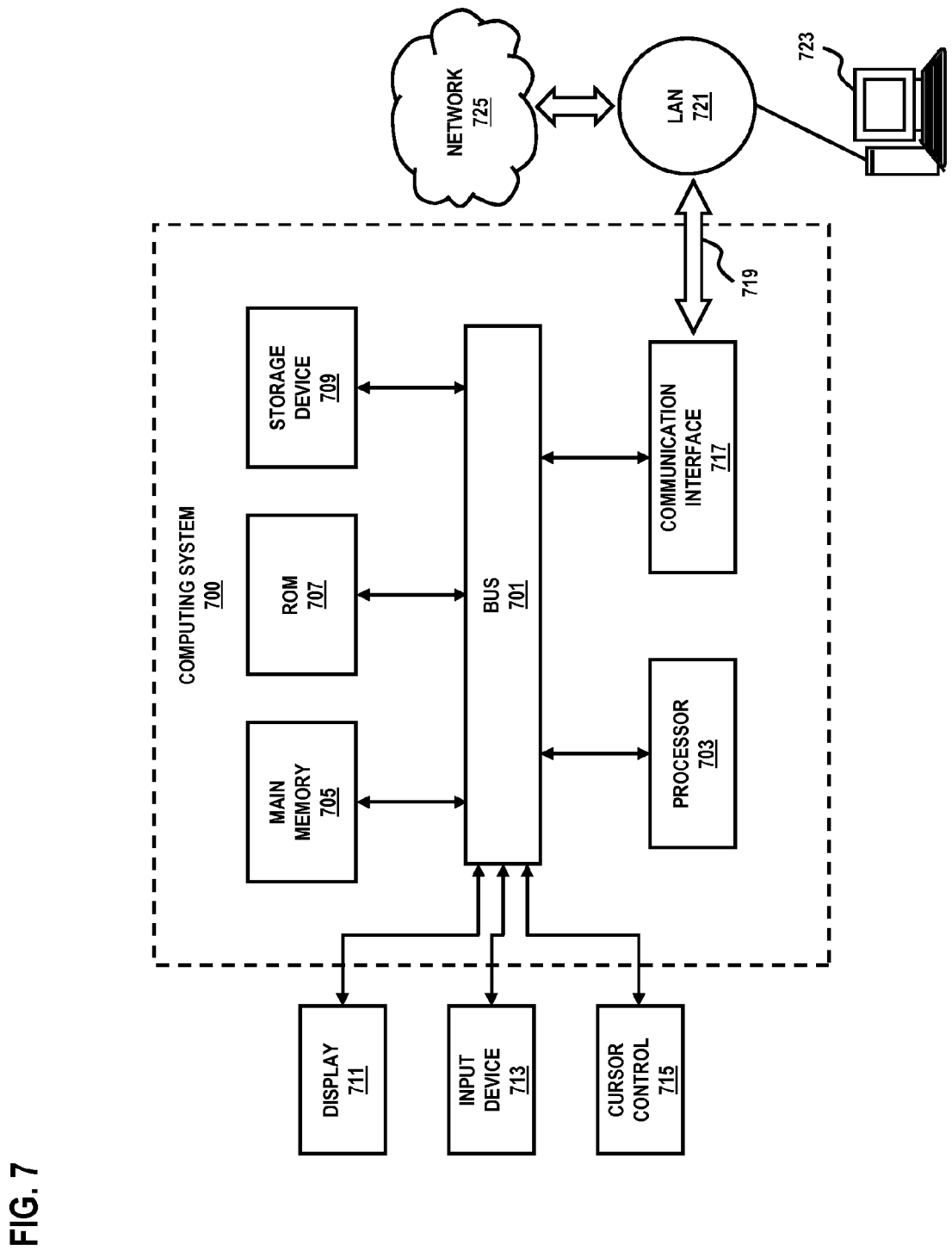
FIG. 7 is a diagram of a computer system that can be used to implement various exemplary embodiments.

FIG. 7 illustrates computing hardware (e.g., computer system) 700 upon which exemplary embodiments can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set 800 upon which an embodiment of the invention may be implemented. Chip set 800 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 2, 3A-3C, and 6B.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to providing notification of a change in path condition. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    detecting, at a node within a network of multiple protocol label switching (MPLS) nodes, a failure condition affecting the node;
    detecting a micro-loop with a neighboring node of the affected node;
    determining a label of a destination of a subsequent hop from the neighboring node to break the micro-loop for redirecting of traffic to a destination node in the network, wherein the subsequent hop does not create a loop with respect to the affected node and is determined to satisfy a predetermined threshold value;
    generating a first MPLS label specifying the neighboring node as a destination from the affected node; and
    generating a second MPLS label specifying the destination node of the subsequent hop from the neighboring node to break the micro-loop, wherein the labels are included in a stack of labels created for a packet being forwarded from the affected node to the neighboring node,
    wherein the stack is comprised of the first MPLS label, which is a normal label used from the affected node to the neighboring node, on top of the second MPLS label, which specifies a destination of the subsequent hop from the neighboring node, and
    wherein, when the packet containing the created stack reaches the destination of the neighboring node from the affected node, the first MPLS label is taken out and the second MPLS label is left on top of the stack of labels and the packet will be forwarded by the second label to the destination of the subsequent hop.

2. A method according to claim 1, wherein the labels are generated according to a label distribution protocol (LDP).

3. A method according to claim 1, wherein the node and the neighboring node are premise equipment, and at least one of the other nodes in the network is core node.

4. A method according to claim 1, further comprising:
    selecting the subsequent hop from a plurality of subsequent hops that do not create a loop with respect to the affected node, wherein the selected subsequent hop exhibiting the shortest path.

5. A method according to claim 1, further comprising:
    initiating a loop-free alternate (LFA) procedure for the node and the neighboring node; and
    updating an LFA table according to the LFA procedure and the determined label of the subsequent hop.

6. A method according to claim 1, wherein the failure condition includes a link failure or an equipment failure.

7. An apparatus comprising:
    at least one processor; and
    at least one memory including computer program code for one or more programs,
    the at least one memory and the computer program code configured to, with the at least one processor, cause the apparatus to perform at least the following,
        detect, at a node within a network of multiple protocol label switching (MPLS) nodes, a failure condition affecting the node,
        detect a micro-loop with a neighboring node of the affected node,
        determine a label of a destination of a subsequent hop from the neighboring node to break the micro-loop for redirecting of traffic to a destination node in the network, wherein the subsequent hop does not create a loop with respect to the affected node and is determined to satisfy a predetermined threshold value,
        generate a first MPLS label specifying the neighboring node as a destination from the affected node, and
        generate a second MPLS label specifying the destination node of the subsequent hop from the neighboring node to break the micro-loop, wherein the labels are included in a stack of labels created for a packet being forwarded from the affected node to the neighboring node,
    wherein the stack is comprised of the first MPLS label, which is a normal label used from the affected node to the neighboring node, on top of the second MPLS label, which specifies a destination of the subsequent hop from the neighboring node, and
    wherein, when the packet containing the created stack reaches the destination of the neighboring node from the affected node, the first MPLS label is taken out and the second MPLS label is left on top of the stack of labels and the packet will be forwarded by the second label to the destination of the subsequent hop.

8. An apparatus according to claim 7, wherein the labels are generated according to a label distribution protocol (LDP).

9. An apparatus according to claim 7, wherein the node and the neighboring node are premise equipment, and at least one of the other nodes in the network is core node.

10. An apparatus according to claim 7, wherein the apparatus is further caused to:

select the subsequent hop from a plurality of subsequent hops that do not create a loop with respect to the affected node, wherein the selected subsequent hop exhibiting the shortest path.

11. An apparatus according to claim 7, wherein the apparatus is further caused to:
  initiate a loop-free alternate (LFA) procedure for the node and the neighboring node; and
  update an LFA table according to the LFA procedure and the determined label of the subsequent hop.

12. An apparatus according to claim 7, wherein the failure condition includes a link failure or an equipment failure.

13. A system comprising:
  a plurality of multiple protocol label switching (MPLS) nodes forming a network, wherein one of the plurality of nodes is configured to detect a failure condition affecting the one node, to detect a micro-loop with a neighboring node of the affected node, the one node being further configured to determine a label of a destination of a subsequent hop from the neighboring node to break the micro-loop for redirecting of traffic to a destination node in the network, wherein the subsequent hop does not create a loop with respect to the affected node, to generate a first MPLS label specifying the neighboring node as a destination from the affected node, and to generate a second MPLS label specifying the destination node of the subsequent hop from the neighboring node to break the micro-loop, wherein the labels are included in a stack of labels created for a packet being forwarded from the affected node to the neighboring node,
  wherein the stack is comprised of the first MPLS label, which is a normal label used from the affected node to the neighboring node, on top of the second MPLS label, which specifies a destination of the subsequent hop from the neighboring node, and
  wherein, when the packet containing the created stack reaches the destination of the neighboring node from the affected node, the first MPLS label is taken out and the second MPLS label is left on top of the stack of labels and the packet will be forwarded by the second label to the destination of the subsequent hop.

14. A system according to claim 13, wherein the labels are generated according to a label distribution protocol (LDP).

15. A system according to claim 13, wherein the one node and the neighboring node are premise equipment, and at least one of the other nodes in the network is core node.

16. A system s according to claim 13, wherein the subsequent hop is selected from a plurality of subsequent hops that do not create a loop with respect to the affected node, wherein the selected subsequent hop exhibiting the shortest path.

17. A system according to claim 13, wherein the one node is further configured to initiate a loop-free alternate (LFA) procedure for the one node and the neighboring node, and to update an LFA table according to the LFA procedure and the determined label of the subsequent hop.

* * * * *